United States Patent
Biby et al.

(10) Patent No.: US 6,184,261 B1
(45) Date of Patent: Feb. 6, 2001

(54) WATER-RESISTANT DEGRADABLE FOAM AND METHOD OF MAKING THE SAME

(75) Inventors: Gerald Biby, Omaha; Milford Hanna; Qi Fang, both of Lincoln, all of NE (US)

(73) Assignee: Board of Regents of University of Nebraska, Lincoln, NE (US)

( * ) Notice: Under 35 U.S.C. 154(b), the term of this patent shall be extended for 0 days.

(21) Appl. No.: 09/305,937

(22) Filed: May 6, 1999

Related U.S. Application Data

(60) Provisional application No. 60/084,090, filed on May 7, 1998.

(51) Int. Cl.⁷ ........................................................ C08J 9/00
(52) U.S. Cl. ........................ 521/84.1; 521/138; 521/916; 521/82
(58) Field of Search ................................... 521/84.1, 138, 521/916, 82

(56) References Cited

U.S. PATENT DOCUMENTS

| | | |
|---|---|---|
| 5,272,181 | 12/1993 | Boehmer et al. . |
| 5,308,879 | 5/1994 | Akamatu et al. . |
| 5,589,518 * | 12/1996 | Bastioli et al. ..................... 521/84.1 |
| 5,665,786 * | 9/1997 | Xu et al. ............................. 521/84.1 |
| 5,705,536 * | 1/1998 | Tomka ................................ 521/84.1 |
| 5,736,586 * | 4/1998 | Bastioli et al. ..................... 521/84.1 |
| 5,801,207 * | 9/1998 | Bastioli et al. ..................... 521/84.1 |
| 5,854,345 * | 12/1998 | Xu et al. ............................. 521/84.1 |

* cited by examiner

Primary Examiner—Morton Foelak
(74) Attorney, Agent, or Firm—Shook, Hardy & Bacon LLP

(57) ABSTRACT

A foam that is the extrudate of a mixture of a biodegradable polymer, starch, talc, and a blowing agent is provided. This foam is made by extruding a mixture of the above-listed components. This foam is water-resistant and in some variations waterproof making it an effective packing material. Still further, this foam is biodegradable, and thus, it can be disposed without creating environmental waste. In addition, the foam may be extruded into sheets and then thermoformed to form various articles.

15 Claims, No Drawings

WATER-RESISTANT DEGRADABLE FOAM AND METHOD OF MAKING THE SAME

CROSS REFERENCE TO RELATED APPLICATIONS

This application claims priority benefits under Title 35, United States Code § 119(e) of U.S. Provisional Application No. 60/084,090, filed May 7, 1998.

STATEMENT REGARDING FEDERALLY-SPONSORED RESEARCH OR DEVELOPMENT

Not applicable.

BACKGROUND OF THE INVENTION

The present invention relates generally to foam. More specifically, the present invention relates to water-resistant, biodegradable foam that can be used as a packing material or as other foam articles.

Foam is used as a loose-fill packing material to ship various industrial and household products. Conventionally, loose-fill packing materials are manufactured from petroleum plastics. Expanded polystyrene foam, which is made from petroleum plastics, is the most commonly used packing material because it has desirable functionable properties such as a low density, high resiliency, and good water resistance. However, petroleum plastics take an extremely long period of time to degrade after their disposal thus creating environmental pollution.

Degradable foam has been created. However, such foam is not water-resistant, and thus, it does not remain resilient in a high moisture environment. As a result, it is not suitable for use as a packing material.

In order to overcome the disadvantages of currently available packing materials, a foam that is made from renewable resources and which is also biodegradable is provided. Still further, this foam is water-resistant and in some variations is waterproof.

SUMMARY OF THE INVENTION

It is a primary object of the present invention to provide a foam that is biodegradable so that it can be disposed without creating environmental waste but which is also water-resistant so that it can be used as a packing material.

According to the present invention, the foregoing and other objects are achieved by a foam that is the extrudate of a mixture that includes a biodegradable polymer, starch, talc, and a blowing agent. This foam is biodegradable and water-resistant. Another aspect of this invention is a process for making this foam by extruding a mixture of a biodegradable polymer, starch, talc, and a blowing agent through a heated extruder and allowing a foam to form as the mixture exits the extruder.

Additional objects, advantages and novel features of the invention will be set forth in part in the description which follows, and in part will become apparent to those skilled in the art upon examination of the following, or may be learned from practice of the invention. The objects and advantages of the invention may be realized and attained by means of the instrumentalities and combinations particularly pointed out in the appended claims.

DETAILED DESCRIPTION OF THE PREFERRED EMBODIMENT

The foam of the present invention is the extrudate of a mixture that includes a biodegradable polymer, starch, talc, and a blowing agent.

The biodegradable polymer can be any biodegradable polymer including, but not limited to, polylactic acid (PLA), poly(tetramethylene adipate-co-terephthalate), or a resin of a thermoplastic polymer, destructured starch and a plasticizer. If the biodegradable polymer is polylactic acid, both amorphous and semi-crystalline forms of polylactic acid resins are usable. Preferably, the polylactic acid used has a number average molecular weight from about 40,000 to about 180,000. Most preferably, the polylactic acid has a number average molecular weight from about 55,000 to about 87,000. The polylactic acid should have a D-lactide content of between about 0 and 50%. The PLA resin should be dried at 40° C. for 24 hours before it is used. Polylactic acid is water insoluble. It adds ductility and resilience to the foam improving its physical and mechanical properties. It is also fully biodegradable.

If the biodegradable polymer is poly(tetramethylene adipate-co-terephthalate), it may be obtained under the tradename Eastar Bio from Eastman Chemical Company, Kingsport, Tenn. 37662. Poly(tetramethylene adipate-co-terephthalate) is made by condensing 1,4-benzendicarboxylic acid with 1,4,-butandiol and hexanedioic acid.

If a resin of a thermoplastic polymer, destructured starch, and a plasticizer is used as the biodegradable polymer, the starch component of the resin may be any starch of natural or plant origin which is composed essentially of amylose and/or amylopectin. It can be extracted from various plants, such as potatoes, rice, tapioca, maize, as well as cereals, such as rye, oats, wheat and the like. Maize starch is preferred. Preferably, the starch component has an amylopectin content of more than 70% by weight. Chemically-modified starches and starches of different genotypes can also be used. Still further, ethoxy derivatives of starch, starch acetates, cationic starches, oxidized starches, cross-linked starches and the like may be used.

Starch is provided as part of the resin without processing, such as drying, and without the addition of any water (the intrinsic bound water content of the commercial products is approximately 10–13% by weight). The starch is then destructured at temperatures above 90° C. and preferably above 120° C. The term "destructured starch" means a starch which has been heat-treated above the glass transition temperatures and melting points of its components, so that the components are subjected to endothermic transitions to thereby produce a consequent disorder in the molecular structure of the starch granules. In other words, the crystallinity of the starch is destroyed.

The plasticizer used in the resin is preferably a polyol, polyol derivative, polyol reaction product, polyol oxidation product or a mixture thereof. Preferably, the plasticizer has a boiling point of at least 150° C. Examples of plasticizers that can be used include, but are not limited to, glycerine, polyglycerol, glycerol, polyethylene glycol, ethylene glycol, propylene glycol, sorbitol, mannitol, and their acetate, ethoxylate, or propoxylate derivatives, and mixtures thereof. Specific plasticizers that can be used include, but are not limited to, ethylene or propylene diglycol, ethylene or propylene triglycol, polyethylene or polypropylene glycol, 1,2-propandiol, 1,3-propandiol, 1,2-, 1,3-, 1,4-butandiol, 1,5-pentandiol, 1,6-, 1,5-hexandiol, 1,2,6-, 1,3,5-hexantriol, neopentylglycol trimethylolpropane, pentaerythritol, sorbitol acetate, sorbitol diacetate, sorbitol monoethoxylate, sorbitol dipropoxylate, sorbitol diethoxylate, sorbitol hexaethoxylate, aminosorbitol, trihydroxymethylaminomethane, glucose/PEG, the product of reaction of ethylene oxide with glucose, trimethylolpropane, monoethoxylate, mannitol monoacetate, mannitol monoethoxylate, butyl glucoside, glucose monoethoxylate, alpha-methyl glucoside, the sodium salt of carboxymethylsorbitol, polyglycerol monoethoxylate and mixtures thereof. The amount of plasticizer in the resin is approximately 0.05–100% of the weight of the starch, and preferably about 20–100% of the weight of the starch.

The thermoplastic polymer in the resin is a synthetic polymeric component which includes a polymer or copolymer of at least one ethylenically unsaturated monomer, the polymer or copolymer having repeating units provided with at least a polar group such as hydroxy, alkoxy, carboxy, carboxyalkyl, alkyl carboxy or acetal group. Preferred polymeric components included in the resin are polyethylene, polyvinyl alcohol, polyacrylonitrile, ethylene-vinyl alcohol copolymer, ethylene-acrylic acid copolymer and other copolymers of an olefin selected from ethylene, propylene, isobutene and styrene with acrylic acid, vinyl alcohol, and/or vinyl acetate and mixtures thereof. Most preferably, one of the polymers in the resin is an ethylene-acrylic acid copolymer with ethlylene contents of from about 10 to 44% by weight. The resin also may contain relatively low amounts, approximately 5% or less by weight of the overall composition, of hydrophobic polymers, such as polyethylene, polypropylene and polystyrene. Still further, other polymers such as polyamide, polyacrylic, polyester, and polyether may be in the resin. The polymer and starch of the resin may be combined in a 1:19 to 19:1 ratio by weight.

Other components such as destructuring agents, cross-linking agents and neutralizing agents may, optionally, be added to the resin but are not essential components. Preferably, a destructuring agent is added while making the resin. The destructuring agent may be urea, alkaline and alkaline-earth hydroxides, and mixtures thereof. Examples of alkaline and alkaline-earth hydroxides include but are not limited to sodium, potassium and calcium hydroxides. Most preferably, urea is added as the destructuring agent. Urea improves the gelling of the starch with small amounts of water, and hence enables the production of a uniform film. Preferably, the amount by weight of destructuring agent added to the resin is 2–20% of the weight of the starch. However, if a destructuring agent is not added, it is still possible to destructure the starch through heat or pressure.

The resin also may contain cross-linking agents such as aldehydes like formaldehyde, paraformaldehyde, and paraldehyde; keytones and glyoxals; epoxides like epichlorohydrin; process coadjuvants and release agents; and lubricants which are normally incorporated in compositions for molding or extrusion such as fatty acids, esters of fatty acids, higher alcohols, polythene waxes, and low density polyethylene (LDPE).

The resin further may contain a neutralizing agent, such as ammonia or any amine, sufficient to neutralize some or all of the acid groups of the polymer if an acidic polymer such as ethylene-acrylic acid copolymer is used. Ammonia may be added to the resin in quantities up to about 7% of the weight of the dry starch. However, most of the ammonia should be removed before or during extrusion. Preferably, about 0.5% or less by weight of the ammonia remains in the final resin formulation. Urea, in addition to functioning as a destructuring agent, also may function as a neutralizing agent.

Although optional, the use of boron containing compounds results in substantially better interpenetration between the hydrophilic starchy phase and the hydrophobic polymeric phase, with a resultant substantial improvement in mechanical properties, particularly tear strength and transparency of sheets and films obtained from various formulations of the resin. Boron, boric acid, borax, metaboric acid, or other boron derivatives may be used in the resin. Preferably, the boron containing compound, expressed as the boron content, is between about 0.002 and 0.4% and preferably between about 0.01 and 0.3% of the total weight of the resin.

Other additives also may be mixed into the resin. For example, polyvinyl alcohol may be added to change the behavior of molded articles with water; UV stabilizers, such as, carbon black, may be added to improve the resistance of the articles to sunlight; and flame-proofing agents may be added if desired. The addition of inorganic salts of alkali or alkaline-earth metals, particularly lithium chloride and sodium chloride at concentrations between about 0.1 and 5% by weight of the resin, preferably between about 0.5 and 3% by weight, also was found advantageous. Other additives which may be in the resin include the conventional additives generally incorporated in starch-based molding compositions, such as fungicides, herbicides, antioxidants, fertilizers, opacifiers, stabilizers and plasticizers. All these additives may be used in conventional quantities as known to experts in the field or as easily determined by routine tests, and these additives may constitute up to about 20% by weight of the final composition.

The resin is made by mixing the essential components, namely, the starch, plasticizer and thermoplastic polymer, and any other optionally included components, in a conventional device, such as a heated extruder, which ensures conditions of temperature and shearing stress suitable to render the starch and the polymer compatible from a rheological point of view. The starch's structure is interpenetrated or at least partially interpenetrated by the thermoplastic polymer so as to obtain a thermoplastic melt. The starch may be destructured before it is combined with the polymer, or as it is combined. A destructuring agent may be mixed with the starch and the plasticizer in a heated extruder to destructure it. Preferably, the mixture is extruded to form the resin at a temperature between about 100° C. and 220° C.

Preferably, the resin is a film-grade material comprised of about 10–90% by weight polymer or copolymer, about 10–90% by weight destructured starch, about 2–40% by weight plasticizer, about 0–20% by weight destructuring agent, and about 0–6% by weight water. More preferably, the resin is comprised of about 20–70% by weight destructured starch, about 10–50% by weight polymer or copolymer, about 2–40% by weight plasticizer, about 0–10% by weight destructuring agent, about 1–5% by weight water, and about 0.002–0.4% by weight boron compounds. One of the most preferred formulations of the resin is 41% by weight ethylene-acrylic acid copolymer with 20% by weight acrylic acid, 12% by weight urea, 41% by weight destructured starch, 20% by weight plasticizer, and 6% by weight water.

Most preferably, the resin which is used as the biodegradable polymer in making the foam of this invention is resin sold by Novamont, S.p.A., via G. Fauser, 8-28100 Novara, Italy, under the trademark Mater Bi™.

The starch used in making the foam of the present invention may be any starch of natural or plant origin, which is composed of at least 25% amylopectin. Examples of plants it may be extracted from include, but are not limited to, corn, wheat, sorghum, potato, rice, rye, oats, or tapioca. If corn starch is used, it should have an amylose content between about 0 and 75%. It should have a moisture content between about 16 and 24% on a dry basis (d.b.). Preferably, it has a moisture content between about 18 and 20%. If waxy corn starch (100% amylopectin) is used, a foam with better resilience and a smoother surface is created. Preferably, the starch is granulated into particles of a diameter of about 1 to 5 millimeters before it is mixed with the other components to form the foam of the present invention. Starch is used in making this foam because it has an inherent expansion characteristic when you extrude it. It gives a foam-type structure, and in addition, it is inexpensive and readily available. The starch gives the foam a fairly rigid structure. So, although starch is used for its foaming ability, it should not be used alone but instead should be with a biodegradable polymer. The biodegradable polymer then provides the resilient properties of the foam. Still further, starch is somewhat soluble in water, however, when it is combined with a biodegradable polymer, a foam is obtained that is water-resistant. Still further, the starch is biodegradable and is obtained from a renewable resource.

The talc used in forming the foam of the present invention is magnesium silicate. It functions as a nucleating agent. It further functions to improve the texture of the foam by providing foam with a smoother surface.

Any commercial blowing agent or method to cause expansion of the material can be used in forming the foam of the present invention. Examples of blowing agents may be used include, but are not limited to, water, carbon dioxide, and pentane. Preferably, distilled water is used as the blowing agent. The blowing agent functions to expand the product and turn it into a foam.

Optionally, a colorant may be added to the mixture that forms the foam of the present invention.

The foam may include about 10 to 50% biodegradable polymer, about 2 to 10% talc, and up to about 88% starch. Preferably, it includes about 4 to 5% talc. The blowing agent should be about 16 to 26% of the weight of the starch. Preferably, the blowing agent is about 22 to 23% of the weight of the starch. If more biodegradable polymer is used, the foam will have better resilience and water resistance.

The foam of the present invention is made by mixing starch, talc, and a blowing agent together and then adding a biodegradable polymer to the mixture. The starch, talc, and blowing agent are mixed for about 3 to 8 minutes at ambient temperature and then the biodegradable polymer is added and mixed with the mixture for about 2 to 5 minutes. Preferably, a double ribbon mixer is used. The resulting mixture is then processed through an extruder to form a biodegradable, water-resistant foam. More specifically, the starch and talc are mixed in a mixture for about 5 minutes. Distilled water is used to adjust the moisture content of the starch to the desired level. The biodegradable polymer is added and mixed with the other ingredients. An additional blowing agent besides the distilled water is optional. The mixture should be stored in a sealed container to prevent it from losing more moisture. The feed is fed into an extruder by means of a screw feeder. The feed rate can be adjusted accordingly. The operating parameters of the extruder can be controlled by a computer. The screw speed of the extruder should be between about 100 and 300 revolutions per minute. Usually, the mixture stays in the extruder for between about 30 seconds and 1½ minutes. Preferably, a twin screw extruder is used so that all the ingredients are more thoroughly mixed providing a foam with a more uniform structure. Still further, preferably, this twin screw extruder has conical mixing screws and a compression ration of about 3:1. Alternatively, the starch, talc, blowing agent and biodegradable polymer can all be added directly to the extruder at the same time without mixing these components together beforehand.

The temperature profile of the extruder barrel varies depending on the various zones of the extruder. Preferably, the first zone, the feeding zone, has a temperature between about 15 and 90° C. Preferably, the second, third, and die section zones have temperatures between about 140 and 190° C. Most preferably, the first zone has a temperature between about 20 and 40° C. Most preferably, the second zone, the third zone, and the die section have a temperature between about 160 and 185° C. The extruder pressurizes the mixture to between about 1000 and 5000 psi. Once the mixture exits the extruder into a room at ambient temperature and pressure, it expands forming foam. The foam should then be allowed to cool. The foam can be cut into shapes such as rods.

The foam of the present invention is biodegradable and water-resistant. Some variations of this foam are even waterproof. For example, formulations where PLA is used as the biodegradable polymer are waterproof. The density of the foam of the present invention is between about 0.5 and 0.8 pounds per cubic foot. The foam has improved abrasion resistance over typical starch-based foam.

The foam of the present invention may be used as a loose-fill packing material. Still further, it may be extruded into sheets which are then thermoformed into plates, bowls, and fast food packaging containers (clam shells).

The following are examples of various biodegradable foams in methods of making the same which are within the scope of this invention. These examples are not meant in any way to limit the scope of this invention.

In each of the following examples, a C.W. Brabender twin screw extruder (Model CTSE-V, C.W. Brabender, Inc., S. Hackensack, N.J.) was used to run the extrusion. This was a non-mixing mixing co-rotating, twin screw extruder. The screw was conical shaped and had a diameter of 43 millimeters at the feeding end decreasing to 28 millimeters at the die end. The screw length was 365 millimeters. The screws were rotated at a speed between about 40 and 200 revolutions per minute. Preferably, the screws rotated at between about 80 and 120 revolutions per minute. The size of the nozzle opening from the extruder varied in the different examples. Preferably, the nozzle opening is cylindrical and is between about 2 to 8 millimeters. Most preferably, it is between about 3 and 5 millimeters.

EXAMPLE 1

30% by weight of polylactic acid having a molecular weight of 85,000, 4% by weight of talc (magnesium silicate) and 66% by weight of waxy corn starch having a moisture content of 20% (d.b.) were premixed and then fed to a C.W. Brabender CTSE-V co-rotating twin screw extruder. The conical screws had variable diameters decreasing from 43 to 28 mm along their length from the feeding end toward the exiting end. The screws had a length to diameter ratio of 20:1. On the screws there was a mixing zone consisting of incomplete flights. The barrel of the extruder was divided into three heating zones. The die section that was connected to the barrel had a nozzle opening of 3 mm in diameter. Barrel and die temperatures were maintained by electrical heaters.

The temperature at the feeding section of the barrel was held at room temperature while the other two sections and the die were maintained at 150° C. The screws rotated at 150 rpm. The expanded extrudate having a diameter of 12 to 20 mm was cut into cylindrical shapes of one inch long using a rotating cutter mounted in front of the extruder nozzle.

EXAMPLE 2

25% of weight of Eastar Bio Copolyester 14766 from Eastman Chemical Co. (Kingsport, Tenn.), 5% by weight of talc (magnesium silicate) and 71% by weight of 25% amylose corn starch having a moisture content of 22% (d.b.) were premixed and then fed to a C.W. Brabender CTSE-V co-rotating twin screw extruder. The conical screws had variable diameters decreasing from 43 to 28 mm along their length from the feeding end toward the exiting end. The screws had a length to diameter ratio of 20:1. On the screws there was a mixing zone consisting of incomplete flights. The barrel of the extruder was divided into three heating zones. The die section that was connected to the barrel had a nozzle opening of 3 mm in diameter. Barrel and die temperatures were maintained by electrical heaters.

The temperature at the feeding section of the barrel was held at room temperature while the other two sections and the die were maintained at 150° C. The screws rotated at 160 rpm. The expanded extrudate having a diameter of 12 to 18 mm was cut into cylindrical shapes of one inch long using a rotating cutter mounted in front of the extruder nozzle.

EXAMPLE 3

20% by weight of Mater-Bi ZF03U/A from Novamont S.p.A. (Milan, Italy), 5% by weight of talc (magnesium silicate) and 71% by weight of 25% amylose corn starch having a moisture content of 18% (d.b.) were premixed and then fed to a C.W. Brabender CTSE-V co-rotating twin screw extruder. The conical screws had variable diameters decreasing from 43 to 28 mm along their length from the feeding end toward the exiting end. The screws had a length to diameter ratio of 20:1. On the screws there was a mixing zone consisting of incomplete flights. The barrel of the extruder was divided into three heating zones. The die section that was connected to the barrel had a nozzle opening of 3 mm in diameter. Barrel and die temperatures were maintained by electrical heaters.

The temperature at the feeding section of the barrel was held at room temperature while the other two sections and the die were maintained at 150° C. The screws rotated at 180 rpm. The expanded extrudate having a diameter of 10 to 16 mm was cut into cylindrical shapes of one inch long using a rotating cutter mounted in front of the extruder nozzle.

EXAMPLE 4

40% by weight of polylactic acid having a molecular weight of 150,000, 4% by weight of talc (magnesium silicate) and 56% by weight of waxy corn starch having a moisture content of 24% (d.b.) were premixed and then fed to a C.W. Brabender CTSE-V co-rotating twin screw extruder. The conical screws had variable diameters decreasing from 43 to 28 mm along their length from the feeding end toward the exiting end. The screws had a length to diameter ratio of 20:1. On the screws there was a mixing zone consisting of incomplete flights. The barrel of the extruder was divided into three heating zones. The die section that was connected to the barrel had a nozzle opening of 3 mm in diameter. Barrel and die temperatures were maintained by electrical heaters.

The temperature at the feeding section of the barrel was held at room temperature while the other two sections and the die were maintained at 150° C. The screws rotated at 200 rpm. The expanded extrudate having a diameter of 14 to 25 mm was cut into cylindrical shapes of one inch long using a rotating cutter mounted in front of the extruder nozzle.

EXAMPLE 5

30% by weight of Eastar Bio Copolyester 14766 from Eastman Chemical Co. (Kingsport, Tenn.), 5% by weight of talc (magnesium silicate) and 65% by weight of waxy corn starch having a moisture content of 22% (d.b.) were premixed and then fed to a C.W. Brabender CTSE-V co-rotating twin screw extruder. The conical screws had variable diameters decreasing from 43 to 28 mm along their length from the feeding end toward the exiting end. The screws had a length to diameter ratio of 20:1. On the screws there was a mixing zone consisting of incomplete flights. The barrel of the extruder was divided into three heating zones. The die section that was connected to barrel had a rectangular nozzle opening of 30×2 mm. Barrel and die temperatures were maintained by electrical heaters.

The temperature at the feeding section of the barrel was held at room temperature while the other two sections and the die were maintained at 150° C. The screws rotated at 160 rpm. The expanded extrudate having a rectangular dimension of 30×8 mm was cut into one inch long pieces using a rotating cutter mounted in front of the extruder nozzle.

EXAMPLE 6

40% by weight of polylactic acid having a molecular weight of 100,000, 6% by weight of talc (magnesium silicate) and 54% by weight of waxy corn starch having a moisture content of 24% (d.b.) were premixed and then fed to a C.W. Brabender 2003 GR-8 single screw extruder. The screw had a diameter of 19 mm. The screw had a length to diameter ratio of 20:1, and a compression ratio of 3:1. On the screw there was a mixing zone consisting of incomplete flights. The barrel of the extruder was divided into two heating zones. The die section connecting to the barrel had a nozzle opening of 3 mm in diameter. Barrel and die temperatures were maintained by electrical heaters.

The temperature at the feeding section of the barrel was held at room temperature while the other two sections and the die were maintained at 150° C. The screw rotated at 150 rpm. The expanded extrudate having a diameter of 10 to 24 mm was cut into cylindrical shapes of one inch long using a rotating cutter mounted in front of the extruder nozzle.

From the foregoing, it will be seen that this invention is one well adapted to attain all the ends and objects hereinabove set forth together with other advantages which are obvious and inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth is to be interpreted as illustrative and not in a limiting sense.

We claim:

1. A foam that is the extrudate of a mixture comprising:
   a biodegradable polymer that is selected from the group consisting of poly(tetramethylene adipate-co-terephthalate) and a resin comprised of 10–50% by weight ethylene acrylic acid copolymer, 20–70% by weight destructured starch, 2–40% by weight plasticizer, 0–10% by weight urea, 1–5% by weight water, and 0.002–0.4% by weight boron compounds;

starch having at least 25% amylopectin;

talc; and a blowing agent.

2. The foam of claim 1, wherein said starch is extracted from a plant selected from the group consisting of corn, wheat, sorghum, potato, rice, rye, oats, and tapioca.

3. The foam of claim 2, wherein said blowing agent is selected from the group consisting of water, carbon dioxide, and pentane.

4. The foam of claim 1, wherein said foam is biodegradable and water-resistant.

5. The foam of claim 4, wherein said foam is waterproof.

6. The foam of claim 1, wherein said foam has a density between about 0.5 and 0.8 pounds per square foot.

7. The foam of claim 1, wherein said foam is used as a packing material.

8. The foam of claim 1, wherein said mixture is comprised of about 10–50% biodegradable polymer, about 2–10% talc, and up to about 88% starch.

9. A process for making a foam, comprising:

contacting a mixture of water, starch having at least 25% amylopectin, talc, and a biodegradable polymer selected from the group consisting of poly (tetramethylene adipate-co-terephthalate and a resin comprised of 10–50% by weight ethylene acrylic acid copolymer, 20–70% by weight destructured starch, 2–40% by weight plasticizer, 0–10% by weight urea, 1–5% by weight water and 0.002–0.04% by weight boron compounds, under conditions sufficient to form a foam.

10. The process of claim 9, wherein said water, said starch, and said talc are mixed together before said polymer is added to said mixture.

11. The process of claim 9, wherein said mixture is extruded through an extruder.

12. The process of claim 11, wherein said mixture is extruded through a heated extruder that is heated to between about 140 and 190° C.

13. The process of claim 11, wherein said extruder is a twin screw extruder.

14. The process of claim 9, further comprising:

thermoforming said foam.

15. The process of claim 14, wherein said mixture is extruded into sheets and said sheets are thermoformed into various articles.

* * * * *